United States Patent [19]
Weil

[11] 3,745,443
[45] July 10, 1973

[54] POWER SUPPLIES WITH OUTPUT VOLTAGE TAPS FROM INPUT FILTER CHOKE

[75] Inventor: Thomas A. Weil, Wellesley, Mass.
[73] Assignee: Raytheon Company, Lexington, Mass.
[22] Filed: Dec. 7, 1971
[21] Appl. No.: 205,590

[52] U.S. Cl............ 323/DIG. 1, 321/10, 321/27 R, 323/17
[51] Int. Cl. ............................................ H02m 7/04
[58] Field of Search................... 323/17, DIG. 1, 43, 323/55; 321/2, 10, 27; 307/240; 333/79

[56] References Cited
UNITED STATES PATENTS

| | | | |
|---|---|---|---|
| 3,621,361 | 10/1971 | Barth | 323/DIG. 1 |
| 3,434,030 | 3/1969 | Bedford | 321/2 |
| 3,388,310 | 6/1968 | Etter | 321/45 C |
| 3,328,674 | 6/1967 | Bleicher | 323/DIG. 1 |

FOREIGN PATENTS OR APPLICATIONS 278,784  12/1970  U.S.S.R........................ 323/DIG. 1

Primary Examiner—William H. Beha, Jr.
Attorney—Milton D. Bartlett, Herbert W. Arnold et al.

[57] ABSTRACT

A power supply circuit which provides a simple means for obtaining several output voltages bearing a fixed ratio to each other. The circuit utilizes a multiple tapped choke which is connected to a source of D.C. voltage by a chopper or switch which provides a pulsating current at a repetition frequency greater than the L.C. resonant frequency of the choke and the filter capacitor at the D.C. output terminals. Several variations of the circuit are disclosed wherein the multiply-tapped choke, or equivalently several magnetically coupled windings, are connected in series with a free-wheeling diode which is always in the state of conduction except during the duration of an input pulse of current through the input chopper or switch so that there is always current in the inductive choke. Additional switching means such as a diode is connected from the taps on the choke to output terminals and is disposed to conduct during the free-wheeling period to extract the several output voltages, each bearing a fixed ratio to the other. To reduce output voltage ripple, capacitors are connected across the output taps to maintain the output voltages substantially constant during the entire cycle.

4 Claims, 8 Drawing Figures

3,745,443

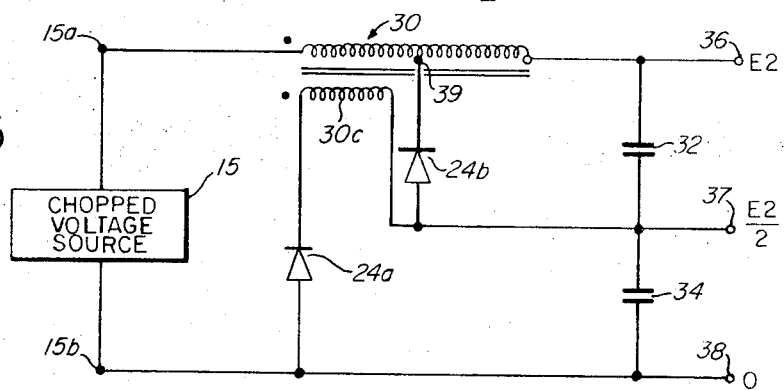
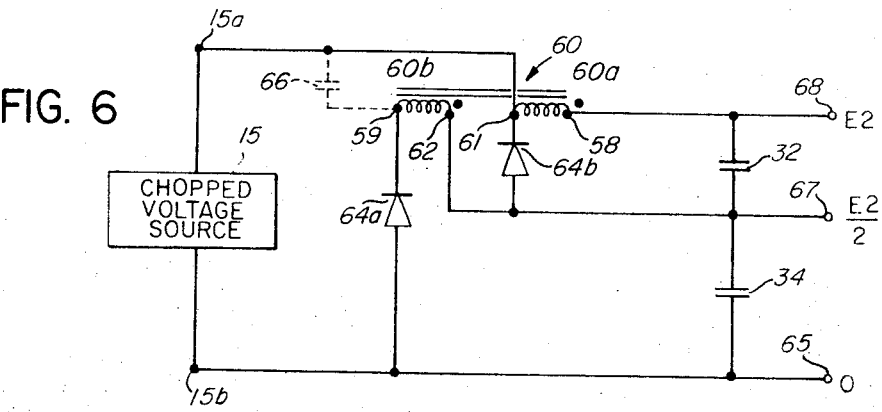
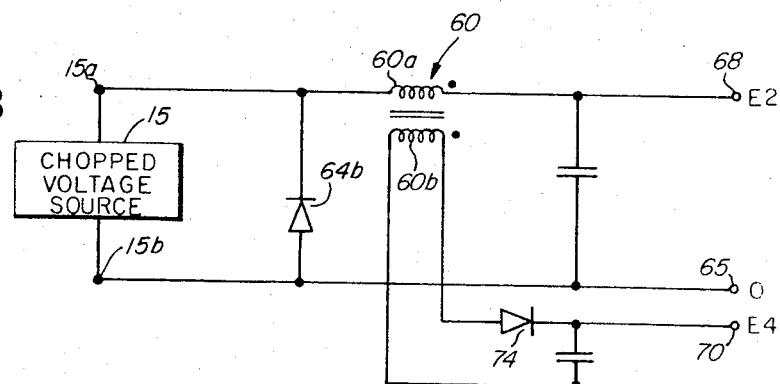
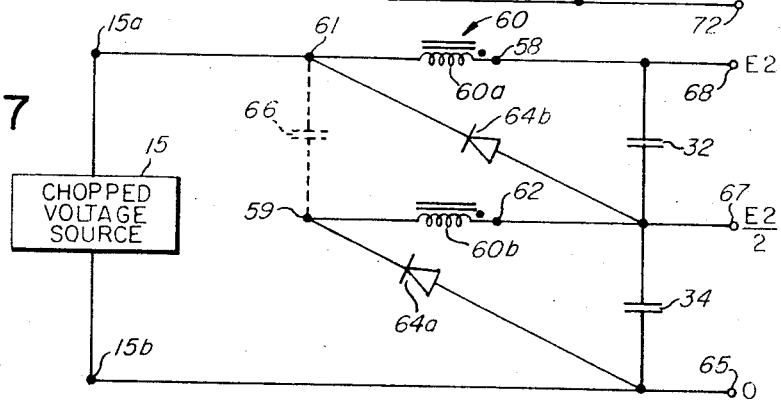

POWER SUPPLIES WITH OUTPUT VOLTAGE TAPS FROM INPUT FILTER CHOKE

BACKGROUND OF THE INVENTION

This invention relates to direct current power supplies and more specifically to power supplies having the characteristics of a choke input and which utilize the choke in a novel manner to provide efficient and accurate division or ratio of voltage at output voltage taps of such power supplies.

In many direct current power supplies it becomes desirable to provide a simple means for obtaining several output voltages bearing a fixed ratio to each other without the necessity of employing the usual current-draining voltage-divider resistor circuits which materially reduce the efficiency of the power supply and result in poor regulation at the taps. Choke-input supplies are often used to provide improved regulation against load variations, which is obtained as long as the instantaneous current in the choke does not drop to zero, in which case the steady state D.C. output voltage equals the average value of the rectified transformer voltage less only the IR and commutation voltage drops. In connection with commonly used chopper-regulated supplies in which a direct current input is converted to a pulsating current by being interrupted at some portion of each operating cycle, it is also preferable to use a choke-input filter for energy storage to provide for efficient limiting of fluctuations of the chopper current. In such circuits, it is customary to connect a diode, sometimes referred to as a free-wheeling diode, from the input side of the choke to the side of the load opposite to the choke. By this connection, current remaining in the choke when the chopper or switch opens flows through the free-wheeling diode, which thus permits continuous current to flow in the choke. As a result, the choke causes the steady state D.C. output voltage to equal substantially the input or source voltage applied to the chopper multiplied by the fractional ON time or duty cycle of the chopper. When it is desired to provide more than one output voltage it is usually necessary to provide another separate chopper or rectifier if the resistor voltage divider arrangement is to be avoided. It is, therefore, an important object of the invention to provide a filter circuit for a direct current power supply which is adapted to produce outputs at more than one voltage level, the ratio between such voltage levels being substantially constant.

Furthermore, it is recognized that in power supply circuits of the prior art which utilize a choke-input filter and free-wheeling diode, the voltage supplied from the source to the input of the filter is zero during some part of each cycle. This is true regardless of whether the source is an alternating current sine wave, or a square wave connected to a conventional full-wave bridge rectifier, or a direct current source which has been chopped by a well-known SCR or transistor chopper. During the OFF time of the chopper, when the chopper current is interrupted, the current in the filter choke can continue to flow, herein called "free wheeling," even though current is not being supplied from the source. This current flows through the free-wheeling diode, which is commonly used with a chopped direct current source, or through the full-wave rectifier bridge which itself can serve as the free-wheeling diode. In other words, during the ON time of the source, current flows around the path through the choke, the load and the source, whereas during the OFF time of the source current, the choke current free wheels or continues to flow around a path through the choke, the load and the free-wheeling diode. In addition, it is generally recognized that since the choke cannot support any D.C. average voltage across itself, the D.C. output voltage across the filter capacitor at the output of the choke must equal the average value of voltage at the input of the choke. The output voltage is constant except for IR drops and commutation drop, thus providing the well-known "good regulation" of choke-input power supplies. Similarly, the output voltage can be varied by varying the average value at the input of the choke, which, as is known, is done by varying the duty cycle or fractional ON time of the source or the chopper. A typical power supply circuit which varies the duty cycle of silicon controlled rectifiers in the power source to control the output voltage is shown at page 296 of "Semiconductor Controlled Rectifiers" by Gentry, Gutzwiller, Holonyok, Von Zastrow, published 1964, by Prentice Hall, and in the Library of Congress, Card No. 64–21172. Also, as is known, since the free-wheeling current is not drawn from the source, the average value of the output current can be greater than the average value of the input current.

When the duty cycle is nearly unity, the free-wheeling time is negligible, and the input current from the source and the output current are essentially equal. However, when the duty cycle is small, the free-wheeling time is large, and the output current is much larger than the input current. The filter and free-wheeling diode can thus be considered to act as a "D.C. transformer" in which D.C. current and voltage are transformed by the duty cycle ratio. Since the output voltage is smaller than the source voltage by a factor equal to the duty cycle ratio, and since the source current is smaller than the output current by a factor equal to the duty cycle ratio, input power and output power are equal, energy is conserved, and the circuit operates very efficiently. It is accordingly an object of the invention to provide a relatively simple circuit which recognizes the aforementioned principles and utilizes the free-wheeling current during the free-wheeling period to obtain, from taps on the free-wheeling choke, output voltages which bear a fixed ratio to each other and to the output voltage at the usual direct current output terminals.

SUMMARY OF THE INVENTION

In accordance with the present invention, a plurality of output voltages bearing a fixed ratio to each other are obtained from a tapped inductance, such as a filter choke, by recognizing that during the free-wheeling period, one end of the filter choke is at the D.C. output voltage and the other end is at ground, that is, at the return side of the load opposite to the choke, and that consequently, the full D.C. output voltage appears across the choke, uniformly distributed across the choke winding. A center tap on the choke, for example, will be at half the D.C. output voltage during this time. Accordingly, the invention provides for the connection of an additional switch, such as a transistor or other semiconductor switch to this center tap or to each additional tap of the choke. The additional diode is poled to conduct current from the tap to an output circuit, usually comprising a filter capacitor. During the free-wheeling period, when the free-wheeling diode conducts, this additional switch or diode is also adapted to conduct and thus forces the output voltage from the corresponding tap to be one-half value for the center tap, or different fractional voltages for other output taps. Thus, several taps can be used on the choke to provide several intermediate output voltages. The output voltage from each tap is usually connected through an additional semiconductor switch to an additional filter capacitor for each additional tap of the input choke, the tap power being drawn directly from the choke, and the tap loading the choke only during the free-wheeling period which corresponds to the OFF time of the input chopper or intermittent power source. The circuit operates as a conventional choke input filter during the ON time of the chopper when the free-wheeling diode and additional diodes or switches are open.

The output voltage tap can supply a load as described above, or, alternatively, it can receive current and act as a sink. In this latter case, a simple diode can serve as the semiconductor switch.

The invention further provides for extending the input choke winding in one direction when it is desirable to deliver tapped voltages greater than those available within the choke, or the choke winding can be extended in the other direction when it is desirable to provide output voltages less than zero, that is, below the common ground point. A semiconductor switch is used to connect the choke winding extension to the appropriate output voltage terminal during the free-wheeling period.

These output voltage extensions can deliver current to a load or alternatively can receive current and act as a sink. When these output voltage extensions are used to deliver current to a load, a simple diode can be used as the semiconductor switch.

In another embodiment, there is provided an arrangement in which a plurality of windings share a common magnetic path or core for magnetic coupling, each being connected to a diode or other switch and a corresponding filter capacitor, thus providing separate output voltages bearing a fixed ratio to each other and fully isolated from each other.

In a further embodiment, the separate windings are interconnected in an arrangement in which simple diodes can be used to deliver power at intermediate output voltages.

BRIEF DESCRIPTION OF THE DRAWINGS

Other characteristics of the invention will be apparent upon reference to the following description of the embodiments of the invention schematically illustrated in the accompanying drawings, in which:

FIG. 5 is a schematic diagram of an embodiment which shows one method of providing a half-output voltage tap that can supply power to or receive power from an external source;

FIG. 6 is a schematic diagram of a further embodiment of the invention which permits the use of diodes to provide intermediate output voltage taps without adding extra windings to the choke;

FIG. 7 is the same circuit as FIG. 6 which is redrawn for purposes of clarity; and FIG. 8 is a schematic diagram of an embodiment which permits a fully isolated output voltage to be obtained.

DESCRIPTION OF THE PREFERRED EMBODIMENTS

Figure 1:
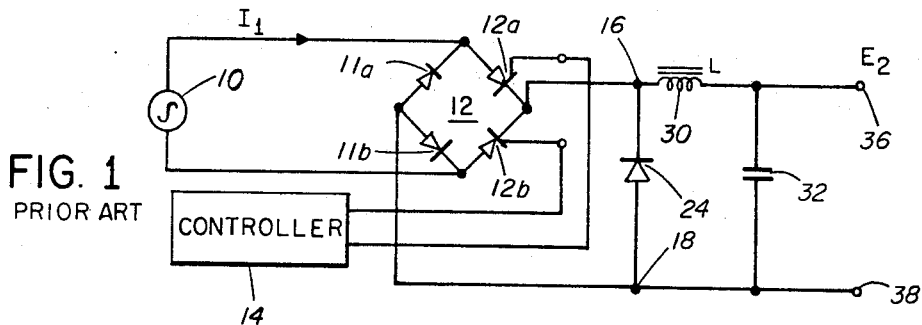
FIG. 1 is a schematic diagram of a well-known choke input power supply incorporating an intermittent or chopped voltage source and a free-wheeling diode.

FIG. 1 shows a well-known direct current power supply which utilizes an A.C. energy source 10, which can be either a sine wave, square wave or other A.C. waveform. This energy source, herein shown as a sine wave, is connected to bridge rectifier 12 comprising two diode rectifiers 11a and 11b in two legs and a conventional phase control switch or chopper comprising a pair of conventional SCR's 12a and 12b in the other legs of the bridge rectifier. This combination is herein referred to as a rectifier-chopper or chopped voltage source and it should be understood that other intermittent power sources, such as a conventional D.C. source and D.C. chopper, can be used. Instead of providing continuous full wave direct current output, the SCR's conduct at a particular time in each cycle by reason of their control electrodes being connected to a conventional controller 14 which generates a series of trigger pulses which cause each SCR to start conducting at a selected time during alternate half cycles at the alternating rate of the source, such as 400 cycles per second. By varying the fractional ON time of both SCR's is a well-known manner, as described in the aforementioned book, the output of the bridge rectifier across filter input terminals 16 and 18 is increased or decreased. In many automatically regulated power supplies this fractional ON time or phase angle is varied by sensing the output of the power supply to provide a constant output voltage with variation of load. The controller 14 is usually synchronized with power source 10 by a circuit, not shown, which samples the voltage of source 10 in a well-known manner. Pulsating direct current from the rectifier-chopper flows into the filter which includes the free-wheeling diode 24 connected across terminals 16 and 18, together with a conventional inductance such as filter choke 30 having a core of magnetic material and a filter capacitor 32. Free-wheeling diode 24 is thus connected to the input end or tap of the choke coil and is poled to remain open when the SCR's are conducting to provide a rectified voltage at the filter input terminals. On each half cycle, however, when SCR's 12a and 12b are open, the voltage at terminal 16 drops until it becomes negative with respect to terminal 18, and as a result the free-wheeling diode conducts and permits current which has been stored in filter choke 30 during the rectifier-chopper ON time to flow through the diode 24 from ground to provide, with filter capacitor 32, a constant output voltage E2 across output terminals 36 and 38, as is usual with choke-input power supplies.

Figure 2:
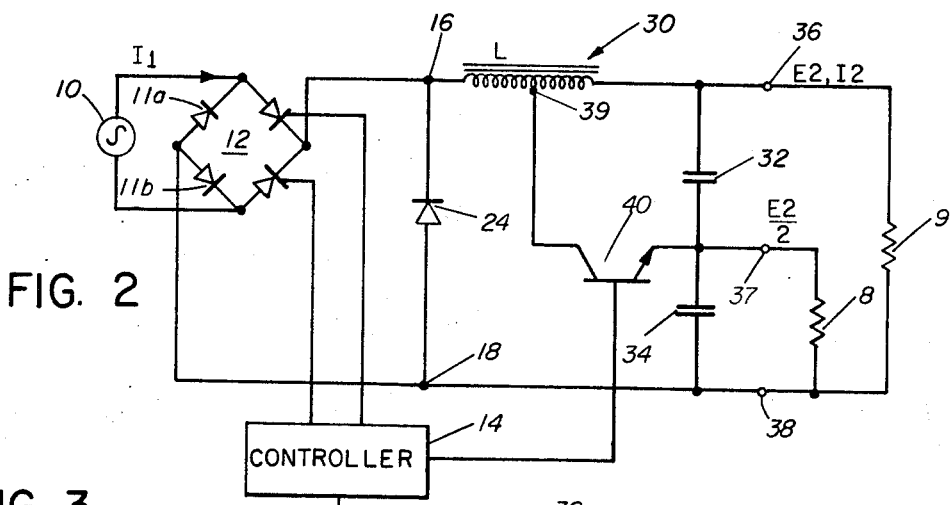
FIG. 2 is a schematic diagram of one embodiment of the invention using a transistor switch to provide an intermediate output voltage tap.

Referring now to FIG. 2 there is shown an embodiment of the invention in which the current flowing in filter choke 30 during the rectifier-chopper OFF time is used in a novel manner to provide a plurality of output voltages bearing a fixed ratio to each other. The rectifier-chopper operates in substantially the same manner as that shown in FIG. 1 and corresponding parts of FIGS. 1 and 2 and following figures bear the same reference numbers. Terminals 36 and 38 are shown supplying power to a load represented by resistor 9. When free-wheeling diode 24 conducts, terminal 16 becomes substantially at ground or zero potential and the entire output voltage E2 appears evenly distributed across the windings of filter choke 30. In this figure, when it is desired to provide a voltage output which is precisely half the total output voltage E2, a center tap 39 is provided on choke 30. Since the voltage at center tap 39 during the rectifier-chopper OFF period is precisely one-half the voltage across the entire choke, a means is provided to extract this voltage, in the form of a switch, herein shown as transistor 40, which is driven into conduction by a signal from controller 14 in a well-known manner and thereby connects the center tap voltage E2/2 to output tap 37 to supply power to a load represented by resistor 8. To store and thus smooth this voltage, an additional filter capacitor 34 is connected in series with capacitor 32, and provides a substantially fixed voltage output E2/2 at tap 37.

It should be noted that while a voltage of value E2/2 is provided at tap 39 and at output tap 37 during the rectifier-chopper OFF time, when the rectifier-chopper is ON the full source voltage is applied to terminal 16 and the voltage on tap 39 for at least a portion of the rectifier-chopper ON time increases from the E2/2 value to a value even greater than E2. However, this voltage is isolated from output terminal or tap 37 by the opening of switch 40 during the ON period of the rectifier-chopper. Thus, the voltage at output terminal 37 remains at precisely one-half the voltage at output terminal 36 even though the source voltage varies and even though the fractional ON time of the rectifier-chopper is made to vary. Accordingly, when the controller 14 is used as a regulator to maintain E2 constant notwithstanding variations in source voltage and load, the voltage at tap 37 also remains constant and at one-half the value of the regulated voltage E2. Similarly, if the controller 14 is used to vary in a well-known manner the output voltage E2, the voltage at output tap 37 also varies in direct proportion. Furthermore, the additional output tap 37, as described, does not prevent the choke from performing its normal function as a choke-input filter, whereby the output voltage becomes the average value of the filter input voltage across terminals 16 and 18, thus providing the customary good output voltage regulation. Also, by providing a choke tap at a different intermediate point, a different fraction of the output voltage is obtained at such intermediate tap or terminal instead of one-half the output voltage.

It should be understood that in contrast with the relatively poor regulation of similar output voltage taps provided by a bleeder resistor connected across output terminals 36 and 38, the output voltage provided at tap 37 provides substantial amounts of power with far superior regulation. For example, assume the circuit of FIG. 2 provides 100 milliamperes load current at terminals 36 and 38 and that the rectifier-chopper is operating at 50 percent fractional ON time. While a bleeder is required to draw 100 milliamperes to provide a center tapped output of 50 milliamperes from such circuit with an output variation as poor as 25 percent regulation, by utilizing in a novel manner the voltage available across the choke during the OFF time of the regulator chopper, an output center tap is provided which can supply, for example, 50 or higher milliamperes with substantially ideal regulation. The reason for this better regulation is that the voltage available at any tap on the choke in the OFF period of the rectifier-chopper remains the same fraction of the output voltage, according to well-known transformer principles, regardless of the current drawn at the center tap. The invention, thus, makes use of this available voltage distribution across the choke, not normally utilized.

Since no current is being continuously bled from the output terminals, as in the case of a bleeder resistor, there remains only the additional requirement during the ON period of the rectifier-chopper of providing the choke with the additional power which was taken from it during the free-wheeling period. During the ON period of the rectifier-chopper, the choke draws both the normal load current required at terminal 36 and an increased amount of current needed to replace the energy taken from choke 30 by the intermediate tap during the free-wheeling period. Thus, the additional power needed to replace the energy used during the free-wheeling period by the intermediate tap is automatically provided to the choke by the rectifier-chopper. This occurs as a result of well-known choke-input-filter principles in which the output voltage E2 is forced to remain substantially equal to the average value of the input voltage at terminals 16 and 18, regardless of load current. During the free-wheeling period, when terminal 16 of the choke is grounded, voltage is evenly divided across the choke by conventional transformer action, in which windings sharing a common magnetic path must have equal volts per turn, as a result of the principle that induced voltage in each turn is equal to the rate of change of flux, which is the same through all turns. Thus, E2 is uniformly distributed across the turns of the choke during the free-wheeling period. Therefore, little or no power is wasted in this novel arrangement since only the power used at the output terminals is drawn from the source, without the continuous power drain of the bleeder.

It is recognized that when current is drawn from the tap 37, although voltage regulation is not degraded by the addition of a tap, the choke current into the main filter capacitor 32 is not longer constant, but is reduced during the ON time and increased during the OFF time of transistor 40. This occurs because the tap power is drawn directly from the choke, and the tap loads the choke only during the ON time of transistor 40. Drawing tap power in this manner somewhat reduces the effectiveness of ripple filtering provided by the choke and tends to raise the ripple at output terminal 36 for a given size of capacitor. Accordingly, the filter capacitors 32 and 34 can be made correspondingly larger to reduce ripple voltage to its previous value.

Figure 3:
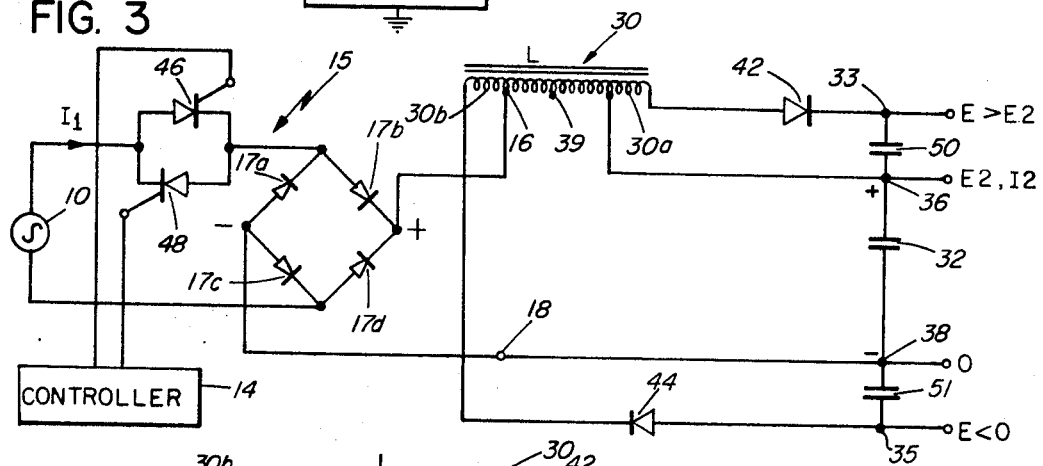
FIG. 3 is a schematic diagram of another embodiment of the invention showing the filter choke winding extended in both directions and the use of diodes to provide multiple output taps.

Referring now to FIG. 3 there is shown an arrangement in which, instead of center tap 39, other taps are used on choke 30 to provide several output voltages bearing fixed ratios to the output voltage E2 and to each other. In this embodiment, an alternate form of chopped or intermittent voltage source 15 is shown instead of source 10 and its bridge circuit 12 of FIGS. 1 and 2. In FIG. 3 intermittent or chopped voltage source 15 comprises A.C. source 10 and back-to-back connected SCR's 46 and 48 having trigger input terminals connected to controller 14 which provides a series of trigger pulses which cause the SCR's to conduct at the desired time on alternate half cycles of A.C. source 10, in a manner similar to that previously described in conjunction with FIG. 1. Also, in this embodiment, the full wave bridge rectifier 17 comprising diodes 17a, 17b, 17c and 17d acts both as a full wave rectifier and as the free-wheeling diode 24 of FIGS. 1 and 2, insasmuch as it is connected in shunt across terminal 16 and node 18. During the free-wheeling period when the SCR's 46 and 48 are open, the voltage at choke terminal 16 drops until it becomes negative with respect to ground point 18, and as a result, diodes 17a and 17b, in parallel with diodes 17c and 17d, conduct and permit current which has been stored in filter choke 30 during the rectifier-chopper ON time to flow from ground point 18 to the choke terminal 16. However, when SCR 46 is triggered into conduction during the positive half cycle of A.C. source 10 by controller 14, only diodes 17b and 17c conduct in the conventional bridge rectifier manner. Similarly, only diodes 17a and 17b conduct when SCR 48 is triggered into conduction. It should be understood that, according to well-known rectifier principles, SCR's 46 and 48 can be substituted for diodes 17b and 17a, respectively, and in this case full wave rectifier-chopper action is obtained and diodes 17c and 17d conduct during the free-wheeling period as described in detail at pages 298-299 of the aforementioned book. Accordingly, when a full wave rectifier is used with a chopper or when the above-described SCR's and diodes are used as the rectifier-chopper, the function of free-wheeling diode 24 of FIG. 2 is provided by the bridge. As a result, the separate free-wheeling diode 24 is omitted from FIG. 3.

FIG. 3 also shows that an output voltage greater than E2 is provided at tap 33 by adding an extension or winding 30a to choke 30 and a conventional diode 42. In like manner, an output voltage lesser than that provided at tap 38, that is, of opposite polarity to the voltage at tap 36, is provided at tap 35 by the addition of winding 30b to the choke 30 and another conventional diode 44. These diodes are poled to conduct during the free-wheeling period and thus to provide multiple output voltages, each bearing a fixed ratio to the conventional output voltage E2 and to each other. Conduction occurs because the voltage at the anode of diode 42 during the free-wheeling period is positive with respect to terminal 38 as a result of the voltage induced in winding 30a by the voltage developed across winding 30 as previously described. In like manner, recognizing that terminal 16 is at the voltage level of terminal 38 during the free-wheeling period because the diodes in bridge 17 are conducting, the voltage at the cathode of diode 44 is negative with respect to terminal 38 and causes diode 44 to conduct.

It should be understood that, in general, the voltages delivered by intermediate taps or extended output voltage taps are maintained at the correct ratios with respect to the normal output voltage point E2 at terminal 36, and the value of the E2 itself remains unaffected, as long as the net average power drawn from these extra output taps does not reduce the choke current to the free-wheeling diode to such a low value that the diode does not conduct during the free-wheeling period. It should be noted in the above arrangement that simple diodes can be used instead of transistor switch 40 of FIG. 2, and that additional diodes can be used with similar arrangements in which additional output voltages that deliver power result from additional extensions or extra windings, not shown, on the filter choke coil.

When there is an intermediate output tap which delivers power, a transistor switch, such as transistor 40 in FIG. 2, is required inasmuch as the polarity across switch 40 does not change during the alternating operation of the rectifier-chopper and the free-wheeling diode. The polarity at diodes 42 and 44 does alternate in FIG. 3 thus permitting diodes to be used as the switching devices. The output voltages are obtained during the free-wheeling period in the same manner as described in FIG. 2, and they are maintained substantially constant during the ON time of the SCR's by capacitors 50 and 51.

Figure 4:
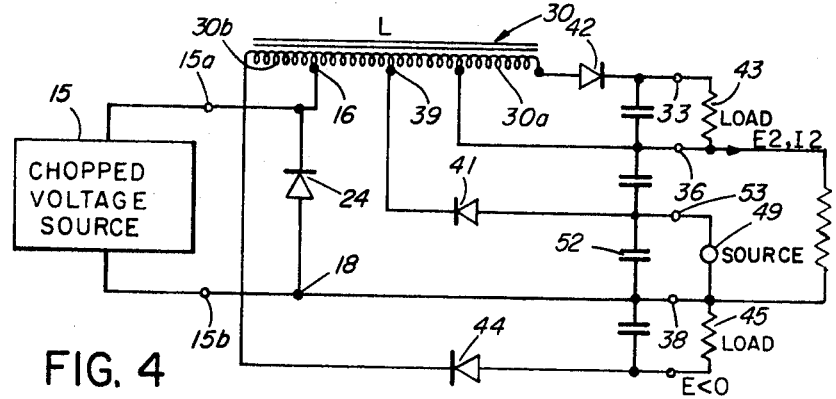
FIG. 4 is a schematic diagram of a further embodiment of the invention in which the filter choke is used as a sink for an external power source in addition to providing multiple output taps.

FIG. 4 shows another embodiment of the invention in which some output taps of the choke are delivering power to loads and an intermediate output tap is receiving power from an external D.C. source and thus acting as a sink for such power. Choke 30 is shown having extended windings 30a and 30b and is further provided with the intermediate tap 39 at the center tap of the original winding. In this circuit, diodes 42 and 44 are poled to conduct and deliver power to their respective loads represented by resistors 43 and 45. Also, FIG. 4 shows an independent external D.C. source 49 connected through diode 41 to the choke at the center tap 39. In this case, the power supply circuit acts as a sink for power received from the independent source 49. For example, a situation in which the circuit acts as a sink occurs when terminals 53 and 38 are used to provide bias voltage for a high-power Class C amplifier, in which normal operation of the amplifier results in D.C. average power being delivered back to the bias supply from the normal R.F. drive source. This power from the Class C amplifier grid circuit, represented by source 49, can be efficiently reclaimed by coupling it to terminals 53 and 38 of FIG. 4. This input source, represented by source 49, charges capacitor 52. During the free-wheeling period, diode 41 conducts and delivers energy from capacitor 52 to choke 30 for use by other outputs of the circuit, regardless of whether or not the other outputs are connected to the aforementioned Class C amplifier. In the manner described, the choke acts as a sink or energy storage device for source 49 during the free-wheeling period and the energy thus received by the choke is efficiently stored and then utilized at other outputs during the subsequent ON time of the rectifier-chopper, and thereby the overall efficiency of the power supply is improved. Because power at tap 53 flows in a direction opposite to that shown at the tap 37 in FIG. 2, a simple diode 41 can be substituted for transistor 40 of FIG. 2. Thus, diode 41 is poled to conduct when voltage at the tap 16 of choke 30 connected to diode 24 approaches zero, thus providing a plurality of output voltages bearing a fixed ratio to each other. It should be understood that chopped or intermittent power source 15 can, for example, be equivalent to that shown by A.C. source 10 of FIG. 2, together with its bridge circuit and controller 14. Thus, chopped power source 15 supplies chopped rectified power at terminals 15a and 15b. Diodes can thus be used as the switches for extended output voltages that deliver power and for intermediate output voltage taps that receive power.

It should be understood that, in cases where power is to be either delivered or received at tap 53, during different periods of time, the transistor 40 of FIG. 2 can be connected in parallel, not shown, with diode 41 of FIG. 4 to permit power to be delivered from the choke to terminal 53. To permit such operation, controller 14 is then used to control transistor 40 to conduct during the free-wheeling period in the manner described in connection with FIG. 2. In this manner, when power is received at terminals 53 and 38, it is delivered to choke 30 by diode 41; and when power is delivered from terminals 53 and 38 to a load, it is supplied from the choke 30 by transistor 40.

In a further arrangement, when source 49 delivers power only intermittently, such as when source 49 represents power from the grid circuit of a Class C amplifier stage and the amplifier is on standby, it is desirable to maintain the voltage at terminal 53 even when source 49 is not delivering power. To avoid the need for a further separate source and to avoid using the parallel arrangement of transistor 40 in shunt with diode 41 as described in the previous paragraph, power can be obtained from one of the higher output voltage taps, such as terminal 36, and coupled to tap or terminal 53. For example, a resistor connected as a bleeder from terminal 36 to terminal 53 provides current to maintain a charge on capacitor 53, even when source 49 is turned off, and diode 41 prevents voltage 53 from becoming any greater than E2/2.

In a further arrangement where the source 49 is connected in place of load 43, it is required to substitute transistor 40 and its controller in place of diode 42 to provide the proper polarity for the extension 30a of the choke 30 to be used as the sink. Similarly, when the source 49 is to be connected in place of load 45, diode 44 is replaced by the transistor 40 and its controller to permit the extension 30b of choke 30 to be used as the sink.

Referring now to FIG. 5, there is shown an arrangement in which simple diodes can be used in connection with an intermediate output voltage tap which delivers power by use of an extra winding on the choke having polarity as indicated. In this case, filter choke 30 is connected to the usual chopped voltage source 15 and is provided with the center tap 39, such as that seen in FIG. 2, and a separate winding 30c having the same turns as one-half the total windings on choke 30 and magnetically coupled to choke 30. Diode 24a is connected from one end of separate winding 30c to the common ground terminal 38 and conducts during the OFF time of chopped direct current source 15 connected to input terminals 15a and 15b. A second diode 24b is connected from center tap 39 to output terminal 37 and poled to deliver output voltage E2/2 during the OFF time of chopped voltage source 15. In this manner, both diodes 24a and 24b conduct during the free-wheeling period and provide output voltage E2/2 bearing a fixed ratio to voltage E2. In operation, therefore, during the free-wheeling period, diode 24a conducts to connect the dotted end of winding 30c to ground. In like manner, diode 24b conducts and connects center tap 39 to the other end of winding 30c, thereby effectively connecting winding 30c in series with the right half of choke 30. Thus, the output voltage E2 at tap 36 is uniformly distributed across the two serially connected windings during the free-wheeling period and the voltage at output tap 37 is forced to be E2/2.

It should be noted that during the free-wheeling period these diodes perform the two functions of carrying the free-wheeling current and of connecting the tap 39 to output terminal 37. In this instance, even though only simple diodes are used as switches, power can be either delivered or received at output voltage tap 37. Thus, in this embodiment no transistor switch 40 is required. In operation, when terminal 37 is used to deliver current to a load connected to terminals 37 and 38, the charge taken from capacitor 34 by the load is replenished during the free-wheeling period by power from winding 30c. This current supplied to capacitor 34 increases the current flow through diode 24a and decreases the current flow through diode 24b. The voltage across terminals 37 and 38 is maintained equal to E2/2 as long as the load is not so heavy that the current in diode 24b is reduced to zero during the free-wheeling period, which would cause diode 24b to remain open during the free-wheeling period and therefore the voltage E2 would not become connected and uniformly distributed along winding 30c and the right half of choke 30. Because the winding 30c and choke 30 are magnetically coupled, the energy delivered from winding 30c to capacitor 34 during the free-wheeling period is replaced by additional energy drawn from chopped voltage source 15 during its subsequent ON time, as previously described in connection with FIG. 2. Similarly, when energy is received at terminal 37 from an external power source, not shown, connected to terminals 37 and 38, the charge supplied to the capacitor 34 by the external source is removed during the free-wheeling period by diode 24b and the right half of winding 30. The current received at capacitor 34 from the external source increases the current flow through diode 24b and decreases the current flow through diode 24a during the free-wheeling period. The voltage across terminals 37 and 38 is maintained equal to E2/2 as long as the amount of current received from the source is not so great that the current in diode 24a is reduced to zero during the free-wheeling period, which would cause diode 24a to remain open during the free-wheeling period and therefore the voltage E2 would not become connected and uniformly distributed along winding 30c and the right half of choke 30. The energy received by the right half of choke 30 during the free-wheeling period results in less energy being drawn from the chopped voltage source 15 during its subsequent ON time, with the result that the power drawn from the chopped voltage source is directly reduced by the amount of power received at terminal 37 from the external power source.

It should be understood that, by appropriate selection of the turns ratio between winding 30c and winding 30, and by selecting the corresponding position for the tap 39, other output voltage ratios than E2/2 can be provided. Furthermore, when another intermediate output voltage tap in addition to terminal 37 is desired, additional diodes and winding, corresponding to diodes 24b, 24a and winding 30c, can be connected to an additional tap on winding 30 in a similar manner to provide an additional output voltage across an additional output capacitor. Alternatively, the additional intermediate output voltage tap can be provided by an additional diode and winding, corresponding to diode 24a and winding 30c, by connecting them in series with diode 24a and winding 30c and to an additional output capacitor.

Referring now to FIG. 6 there is shown an arrangement which permits the use of diodes to provide intermediate output voltage taps without having to add extra windings to the choke. In this embodiment, a choke 60 is shown in which the winding is divided into two magnetically coupled separate sections such that the leads to windings on each side of electrical center form individual taps 61 and 62. The choke thus consists of winding section 60a having end taps 61 and 58 and winding section 60b having end taps 59 and 62. The input connection from the conventional chopped voltage source 15 is in this case connected to the tap 61 on the choke. The effect of connecting the input from the chopped voltage source to a tap on the choke rather than to the same point where the free-wheeling diode is connected does not prevent the output taps from providing outputs having fixed ratios to each other. This arrangement of connecting the input source to tap merely affects the ratio of output voltage to the input voltage and permits the use of a split winding. In fact, the input voltage could be connected to a tap in any of the figures shown without preventing the novel output taps from providing the output voltage ratios as previously described.

In FIG. 6, tap 61 is the highest intermediate tap in the two-section embodiment shown. It should be understood that when more sections and diodes are used, the input from the power source is connected to the tap on the input side of the highest intermediate section, that is, the section connected to output terminal 68 which provides the normal output voltage E2. Free-wheeling diodes 64a and 64b are connected in circuit with windings 60a and 60b. Diode 64a is poled to conduct free-wheeling current from the ground lead 65 through winding 60b to similarly poled diode 64b and through winding 60a to output terminal 68. The junction of terminal 62 and diode 64b forms an intermediate tap which provides a voltage E2/2 during the free-wheeling period. Since the two windings 60a and 60b are magnetically coupled and are connected in series by diodes 64a and 64b during the free-wheeling period, the voltage E2 appears uniformly distributed across the series combination of these two sections of the choke during that time and thus the connection between the two windings of equal turns is at E2/2 during the free-wheeling period and thereby causes output terminal 67 to be at voltage E2/2. The circuit thus operates in substantially the same manner as that of FIG. 5 with the exception that since the point on the choke supplied with power from the chopped voltage source does not go to zero voltage during the free-wheeling period, the voltage E2 varies as a different function of the duty cycle than the simple linear function usually obtained. Nevertheless, the voltage at terminal 67 is maintained at E2/2 as previously described. The peak free-wheeling current is lowered because it flows through more turns than that of the chopped voltage source. The current to the filter capacitors at terminal 68 from the choke is increased during the ON time and decreased during the OFF time with a corresponding tendency to increase the output voltage ripple. However, when the small increase in ripple is considered unimportant, or when larger capacitors are used to prevent the ripple from being increased, the arrangement permits the use of a simple diode as the switch to provide an intermediate output voltage tap without as many windings on the choke as shown in FIG. 5, the left half of winding 30 in FIG. 5 being eliminated by the arrangement shown in FIG. 6. Within its current limit, the output voltage at center tap 67 is constrained by the circuit to be precisely one-half the output voltage, except for IR drops and ripple. It should be understood that the polarity of the split windings is as indicated, and that, when more convenient, diode 64a can be moved from the ground side of winding 60b and be inserted between tap 62 and the anode of diode 64b. The circuit thus modified operates in the same manner as FIG. 6 inasmuch as the diode 64a remains poled to conduct current from lead 65 through winding 60b to diode 64b. Similarly, as noted in connection with FIG. 5, values of intermediate output voltage other than E2/2 can be obtained by changing the turns ratio. Also, more than one intermediate output voltage can be provided, each having a fixed ratio to E2, by the use of additional windings and diodes.

The invention further discloses the addition of a capacitor 66, connected between terminals 59 and 61 of the choke windings, which cooperates with the capacitor 32, which is connected between terminals 58 and 62 of the choke windings, to provide improved coupling between windings 60a and 60b by bypassing the normal leakage inductance present between these windings. As shown in FIG. 7, which is FIG. 6 redrawn for clarity, capacitor 32 maintains terminals 58 and 62 of the choke at a fixed D.C. voltage with respect to each other. Without capacitor 66, the circuit depends on mutual coupling between windings 60a and 60b to cause fluctuations in voltage at terminal 61 to be reproduced at terminal 59, to provide precisely equal division of voltage across the windings during the free-wheeling period. The addition of capacitor 66 forces the voltages at terminals 61 and 59 to vary precisely together, at a fixed voltage apart, in spite of imperfect coupling or leakage inductance between the windings 60a and 60b of the choke 60. This arrangement thus permits a less expensive choke to be used while maintaining the output tap voltage at terminal 67 at precisely E2/2. It should be noted, however, that the addition of capacitor 66 is feasible only when equal windings are used on choke 60 to provide equally divided output voltages. For example, two capacitors can be used with three equal windings, not shown, to provide the same bypassing of leakage inductance in an arrangement that provides output voltages of E2, two-thirds of E2 and one-third of E2. The values of the capacitors are not critical and need not be equal as long as they are large enough to effectively bypass the leakage inductances between the choke windings.

Referring to FIG. 8 there is shown an embodiment in which a separate winding 60b on choke 60 provides a fully isolated output voltage E4 which is obtained at output terminals 70 and 72. In this arrangement the winding 60b is connected only to an additional diode 64a and to output terminal 72 instead of to the ground terminal 65 as in FIG. 6. Only winding 60a is connected to the conventional chopped voltage source 15. In operation, diode 74 and free-wheeling diode 64b are both poled to conduct current through their respective windings to terminals 68 and 70 during the OFF time of the chopped voltage source 15. As the duty cycle of the chopped voltage source is varied, in a conventional manner, to obtain different values of output voltage E2, the ratio of E4 to E2 remains fixed, and the limit on power which can be drawn from the isolated output voltage E4 is substantially the same as the limit on the output tap 67 of FIG. 6. Because the output voltage E4 varies proportionally with E2, it is convenient, when desired, to use such an isolated output voltage to provide a feedback signal to a control circuit which is isolated from the main power circuit.

While diodes 64a and 64b in FIG. 6 are considered free-wheeling diodes, inasmuch as the current delivered to terminal 68 continues to flow through them during the free-wheeling period, diode 74 is not herein considered a free-wheeling diode inasmuch as its current does not flow to terminal 68 even though it is poled to conduct during the free-wheeling period. If diode 74 were poled in the opposite direction, it would conduct during the ON time of chopped voltage source 15 and would provide an output voltage at terminals 70 and 72, but this voltage would not bear a fixed relationship to the normal output voltage E2 as provided by this invention.

The invention is not limited to the particular details of construction or materials described as many equivalents will suggest themselves to those skilled in the art. For example, any combination of intermediate taps or extensions on a choke coil can be used and, similarly, combinations of isolated windings can be used with or without taps or extensions on the choke coil itself. Also, the capacitors serially connected across the output voltage terminals of the power supplies can be separately connected from individual terminals to a common terminal. It is accordingly desired that the invention not be limited to the particular details of the embodiments disclosed herein except as defined by the appended claims.

What is claimed is:

1. A power supply comprising a chopped voltage source and a pair of output terminals, a choke coil comprising at least a pair of separate windings magnetically coupled to each other, the first of said windings connected in series with one side of said voltage source and an output terminal, a first diode connected from the input side of said second winding to a common connection from the other side of said voltage source and the other output terminal, a second diode connected from a tap on said first winding to the other side of said second winding, an additional output terminal coupled to the common connection of said second diode and said other side of said second winding, said first and second diodes poled to conduct current during the free-wheeling period of said choke from said tap on said first winding through said second winding to said other output terminal and to provide an intermediate voltage at said additional output terminal which bears a fixed ratio to the total output voltage, and filter capacitors connected to said terminals in a manner to provide a filtering action for voltages applied to said terminals.

2. A power supply comprising a chopped voltage source and a pair of output terminals, a choke having at least a pair of independent windings magnetically coupled to each other, the first of said windings connected in series with one side of said voltage source and a first output terminal, a first diode connected from one side of the second of said windings to a common connection from the other side of said voltage source and a second output terminal, a second diode connected from the common terminal of said first winding and said one side of said voltage source to the other side of said second winding, an additional output terminal also connected to said other side of said second winding, said first and second diodes adapted to conduct during the free-wheeling period of said choke and poled in a direction to provide a current path from said second output terminal through said second winding and said first winding to the first output terminal to provide at said additional output terminal an intermediate output voltage which bears a fixed ratio to the voltage developed across both windings of said choke during said free-wheeling period.

3. The apparatus as set forth in claim 2 in which a capacitor is connected from the input of said first winding of said choke to the common connection of said first diode and the said second winding of said choke.

4. A power supply comprising a chopped voltage source and a pair of output terminals, a choke including at least a pair of independent windings magnetically coupled to each other, the first of said windings connected in series with one side of said voltage source and a first output terminal, a first semiconductor device connected in series with the second of said windings and a common connection from the other side of said voltage source and a second output terminal, a second semiconductor device connected in series with the common terminal of said first winding and said one side of said voltage source and said serially connected first device and second winding, an additional output terminal also connected to the side of said second device which is adjacent to and in series with said second winding and its serially connected first device, said first and second devices adapted to conduct during the OFF periods of said chopped voltage source and poled in a direction to provide a current path including said first winding and said second winding and said second output terminal to provide at said additional output terminal an intermediate output voltage which bears a fixed ratio to the voltage developed across said first and second windings of said choke during said OFF periods.

* * * * *